Patented Feb. 17, 1948

2,436,013

UNITED STATES PATENT OFFICE 2,436,013

MONOAZO DYE

Mordecai Mendoza, Manchester, England, assignor to Imperial Chemical Industries Limited, a corporation of Great Britain No Drawing. Application November 13, 1946, Serial No. 709,435. In Great Britain December 5, 1945

2 Claims. (Cl. 260—197)

1

This invention relates to a new azo dyestuff and more particularly it relates to the manufacture of a new azo dyestuff which is especially suitable for dyeing wool by the metachrome process.

According to my invention I manufacture a new azo dyestuff by a process which comprises coupling diazotised 4-nitro-2-aminophenol-6-sulphonic acid with 6-bromo-2-naphthol.

The new dyestuff has the formula:

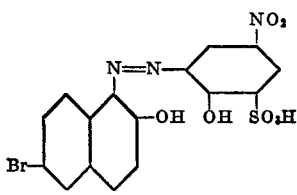

The new dyestuff dyes wool by the metachrome process exhausting well from the dyebath and giving full black shades of very good fastness properties.

The invention is illustrated but not limited by the following example in which the parts are by weight.

Example 23.4 parts of 4-nitro-2-aminophenol-6-sulphonic acid are added to a mixture of 300 parts of water and 25 parts of a 36% aqueous solution of hydrochloric acid. The mixture is stirred and a solution of 7 parts of sodium nitrite in 50 parts of water is added. The solution so obtained is added to a well stirred solution of 22.3 parts of 6-bromo-2-naphthol, 4 parts of caustic soda and 30 parts of sodium carbonate in 300 parts of water. The mixture is stirred at room temperature for 3 hours and the dyestuff is then filtered off, dried and ground. The product is a black powder which is soluble in water and which dyes wool by the metachrome process in black shades of very good fastness properties.

I claim:

1. An azo dyestuff represented by the formula:

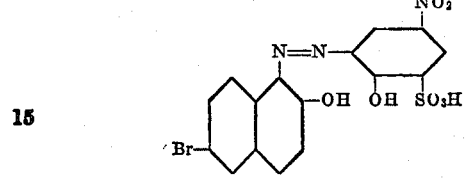

2. A process for manufacturing a new azo dyestuff which comprises diazotising 4-nitro-2-aminophenol-6-sulphonic acid and coupling with 6-bromo-2-naphthol.

MORDECAI MENDOZA.

REFERENCES CITED

The following references are of record in the file of this patent:

UNITED STATES PATENTS

| Number | Name | Date |
|---|---|---|
| 2,109,806 | Straub et al. | Mar. 1, 1938 |
| 2,218,986 | Hoffmann et al. | Oct. 22, 1940 |
| 309,882 | Roussin et al. | Dec. 30, 1884 |
| 1,890,711 | Wollemann | Dec. 13, 1932 |